(12) United States Patent
Lin et al.

(10) Patent No.: US 12,191,523 B2
(45) Date of Patent: Jan. 7, 2025

(54) POLYMER-MODIFIED POROUS MATERIAL, MEMBRANE ELECTRODE, SECONDARY BATTERY, AND ELECTRIC DEVICE

(71) Applicant: CONTEMPORARY AMPEREX TECHNOLOGY (HONG KONG) LIMITED, Hong Kong (CN)

(72) Inventors: Jianghui Lin, Ningde (CN); Yanjie Zhao, Ningde (CN); Xing Li, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/750,818

(22) Filed: Jun. 21, 2024

(65) Prior Publication Data
US 2024/0347859 A1 Oct. 17, 2024

Related U.S. Application Data

(63) Continuation of application No. PCT/CN2022/103871, filed on Jul. 5, 2022.

(51) Int. Cl.
*H01M 50/446* (2021.01)
*H01M 50/46* (2021.01)
*H01M 50/491* (2021.01)

(52) U.S. Cl.
CPC ......... *H01M 50/446* (2021.01); *H01M 50/46* (2021.01); *H01M 50/491* (2021.01)

(58) Field of Classification Search
CPC ... H01M 50/446; H01M 50/46; H01M 50/491
See application file for complete search history.

(56) References Cited

FOREIGN PATENT DOCUMENTS

CN 104053687 A 9/2014
CN 111244460 A 6/2020
(Continued)

OTHER PUBLICATIONS

Wu, Defeng et al., "Graft Copolymerization of Acryamide with Montmorillonite", 2002, Chinese Journal of Colloid & Polymer, vol. 20, 18-21 (Year: 2002).*
(Continued)

*Primary Examiner* — Daniel S Gatewood
(74) *Attorney, Agent, or Firm* — Ladas & Parry LLP (57) ABSTRACT

A polymer-modified porous material, a membrane electrode, and applications thereof are disclosed. The polymer-modified porous material includes a porous material and a plurality of surface groups attached to the porous material; each of the surface groups includes a linking group and an adhesive group that are attached in sequence; the linking group has a structure represented by a structural unit I,

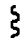

wherein  represents that O is linked to the porous material; the number of the structural units I in each of the surface groups is independent from each other; the total number n of moles of the structural units I in the polymer-modified porous material is 1,000-10,000; and the total number m of moles of the adhesive groups is 10-1,000, and n/m=10-1,000. The problem of serious self-discharge of existing membrane electrodes is alleviated.

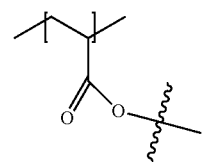

17 Claims, 2 Drawing Sheets

(56) References Cited

FOREIGN PATENT DOCUMENTS

| CN | 111418087 A | | 7/2020 | |
|---|---|---|---|---|
| CN | 114023923 A | | 2/2022 | |
| CN | 111418087 B | * | 12/2022 | ............ C08F 120/12 |
| JP | 2016072162 A | | 5/2016 | |

OTHER PUBLICATIONS

International Search Report dated Apr. 4, 2023 for Application No. PCT/CN2022/103871.
Written Opinion dated Apr. 4, 2023 for Application No. PCT/CN2022/103871.
Wu, Defeng et al., "Graft Copolymerization of Acryamide with Montmorillonite", Chinese Journal of Colloid & Polymer, vol. 20, No. 01, Mar. 25, 2002, pp. 18-21.

* cited by examiner

POLYMER-MODIFIED POROUS MATERIAL, MEMBRANE ELECTRODE, SECONDARY BATTERY, AND ELECTRIC DEVICE

CROSS REFERENCE TO RELATED APPLICATIONS

This application is a continuation of International application PCT/CN2022/103871 filed on Jul. 5, 2022, the subject matter of which is incorporated herein in its entirety.

FIELD

The present disclosure relates to the technical field of batteries, and in particular to a polymer-modified porous material, a membrane electrode, a secondary battery and an electric device.

BACKGROUND

In an active ion battery, a separator mainly functions to prevent contact between positive and negative poles and to allow conduction of active ions, which is an important component of the battery. Presently, polyolefin-based separator materials having a microporous structure, such as single-layer or multi-layer separators of Polyethylene (PE) and Polypropylene (PP), are mainly employed in commercial active ion batteries. Polyolefin separators may provide sufficient mechanical strength and chemical stability for the active ion batteries, but exhibit greater thermal contraction at high temperatures. Thermal contraction leads to contact between positive and negative poles, short-circuit, rapid accumulation of a large amount of heat, thereby causing fire, combustion and even explosion and other safety accidents.

For this reason, inorganic ceramic powders are mostly used to coat the polyolefin separator material of active ion battery for ceramic modification, so as to improve the thermal stability of the separator by using better high temperature thermal stability of the ceramics. At the same time, the better electrolyte wettability of ceramics can also be used to improve the battery performance, such as battery lifespan, discharge efficiency, etc.

Although the ceramic coating may improve the heat resistance of the separator, as the interface structure between the electrode and the separator becomes more complicated, the internal resistance of the battery increases, resulting in a limitation in the electrical performance of the battery. Furthermore, achieving alignment and good contact of the pole plate with the separator during assembly of the active ion battery is also a difficult problem to solve. For this reason, a membrane electrode structure of an integrated unit of an electrode and an inorganic separator comes into being, that is, an inorganic coating layer is coated on the surface of the electrode to form an inorganic separator, so that the electrode and the separator are integrated.

Although such an integrated membrane electrode combines the electrode and the inorganic separator together, which effectively solve the problem of difficult alignment for assembly, the insulating property of the inorganic separator is insufficient, resulting in significant self-discharge of the battery and affecting the cycle performance of the battery.

SUMMARY

The present disclosure provides a polymer-modified porous material, a membrane electrode, a secondary battery and an electric device, so as to solve the problem of serious self-discharge of the existing membrane electrodes.

A first aspect of the present disclosure provides a polymer-modified porous material, the polymer-modified porous material includes a porous material and a plurality of surface groups attached to the porous material; each of the surface groups includes a linking group and an adhesive group that are attached in sequence; the linking group has a structure represented by a structural unit I, Structural unit I where $\xi$ represents that O is linked to the porous material; the number of the structural units I in each of the surface groups is independent from each other; the total number n of moles of the structural units I in the polymer-modified porous material is 1,000-10,000; a monomer forming the adhesive group is selected from any one or more of the group consisting of acrylic acid, ethylene, vinyl alcohol, ethylene imine, propylene, acrylonitrile, vinylidene fluoride, and tetrafluoroethylene; the number of the adhesive groups in each of the surface groups is independent from each other; and the total number m of moles of the adhesive groups in the polymer-modified porous material is 10-1,000, and n/m=10-1,000.

In the polymer-modified porous material of the present disclosure, the surface group and the porous material form a separator in an integral form. Therefore, the porous material may spread well in the coating to form a tightly interlaced organic polymer network, which may improve the insulation of the separator and prevent the occurrence of self-discharge, thereby ensuring the cyclability and long-term safety and reliability of the battery. Furthermore, since a large number of organic groups are grafted on the surface of the porous material, the contact effect of the separator formed of the polymer-modified porous material with the electrolyte is increased, facilitating the infiltration of the electrolyte, and improving the electrochemical performance of the cell. At the same time, by controlling the ratio of the adhesive group and the linking group, not only the barrier effect of the porous material on the electron conduction, but also the sufficient adhesion between the separator formed by the polymer-modified porous material and the pole plate can be ensured, thereby ensuring the long-term cycle stability of the battery.

In any embodiment of the first aspect, m=50-500; optionally n=5,000-1,0000; optionally, n/m=50-500 to provide an insulating barrier with sufficient porous materials and to have sufficient surface groups to optimize the spreading effect of the porous material upon separator formation, so as to further optimize the electron conduction barrier effect of the separator formed by the polymer-modified porous material and the bonding effect with the pole plate.

In any embodiment of the first aspect, the porous material includes at least one of an inorganic material and an organic-inorganic hybrid material.

In any embodiment of the first aspect, the porous material is selected from any one or more of the group consisting of diatomite, zeolite, montmorillonite, kaolin, and a metal-organic framework material. The porous materials described above all have good electron barrier properties.

In any embodiment of the first aspect, the polymer-modified porous material has a $D_{v50}$ of 2 μm-15 μm; optionally, the polymer-modified porous material has a BET specific surface area of 10 to 80 g/m². By using the polymer-modified porous material with the above particle size and specific surface area, there are as many surface groups as possible and there is a better insulating effect.

In a second aspect of the present disclosure, a membrane electrode including a pole plate and a separator is provided. The pole plate includes a current collector and an active material layer disposed on at least one surface of the current collector. The separator is disposed on a surface of the active material layer away from the current collector. The separator includes any one of the polymer-modified porous materials described above.

In the polymer-modified porous material of the present disclosure, the surface group and the porous material form a separator in an integral form. Therefore, the porous material may spread well in the coating to form a tightly interlaced organic polymer network, which may improve the insulation of the separator and prevent the occurrence of self-discharge, thereby ensuring the cyclability and long-term safety and reliability of the battery. Furthermore, since a large number of organic groups are grafted on the surface of the porous material, the contact effect of the separator formed of the polymer-modified porous material with the electrolyte is increased, facilitating the infiltration of the electrolyte, and improving the electrochemical performance of the cell. At the same time, by controlling the ratio of the adhesive group and the linking group, not only the barrier effect of the porous material on the electron conduction, but also the sufficient adhesion between the separator formed by the polymer-modified porous material and the pole plate can be ensured, thereby ensuring the long-term cycle stability of the battery.

In any embodiment of the second aspect, the separator has a thickness of 2-80 m, optionally the separator has a thickness of 5-50 m. Thus, it provides a sufficient insulating barrier effect and facilitates the penetration of active ions.

In any embodiment of the second aspect, the pole plate is a negative pole plate. In order to provide more separator area, sufficient space is reserved for the negative pole to reserve a safe size.

In any embodiment of the second aspect, the peel strength between the separator and the active material layer is 5.5 N/m-15 N/m; optionally, the peel strength between the separator and the active material layer is 6 N/m-14 N/m.

In a third aspect of the present disclosure, a secondary battery including a membrane electrode is provided. The membrane electrode is any one of the membrane electrodes described above.

In a third aspect of the present disclosure, an electric device is provided, including a secondary battery or a battery module or a battery pack. The secondary battery is selected from the secondary batteries described above.

Since the separator in the membrane electrode of the present disclosure has a good insulation property and a good active ion penetration property, the self-discharge problem of the secondary battery and electric device having the membrane electrode is effectively controlled, and the cycle performance and safety performance are optimized.

BRIEF DESCRIPTION OF DRAWINGS

In order to more clearly illustrate the technical solutions in the embodiments of the present disclosure, the drawings to be used in the description of the embodiments will be briefly introduced below. Obviously, the drawings in the description below are only some embodiments of the present disclosure. It will be apparent to those skilled in the art to obtain other drawings according to these drawings without involving any inventive effort.

In the drawings, the drawings are not necessarily drawn to scale.

DESCRIPTION OF REFERENCE NUMERALS

1, Battery pack; 2, upper box body; 3, lower box body; 4, battery module; 5, secondary battery; 51, housing; 52, electrode assembly; 53, top cover assembly.

DETAILED DESCRIPTION

The detailed description of the present disclosure are further described below in combination with the attached drawings and embodiments. The following detailed description of the embodiments and the accompanying drawings are provided to illustrate the principles of the application and are not intended to limit the scope of the application, i.e., the application is not limited to the embodiments described.

Hereinafter, embodiments of a polymer-modified porous material, a membrane electrode, a secondary battery, and an electric device of the present disclosure are specifically disclosed with reference to the accompanying drawings as appropriate. However, there may be cases where unnecessary detailed description is omitted. For example, detailed descriptions of well-known matters and repeated descriptions of practically identical structures are omitted. This is to avoid unnecessarily redundancy of following description to facilitate the understanding of those skilled in the art. In addition, the drawings and the following description are provided to enable those skilled in the art to fully understand the present disclosure and are not intended to limit the subject matter recited in the claims.

The "ranges" disclosed herein are defined in terms of lower and upper limits, a given range is defined by selecting a lower limit and an upper limit, the selected lower and upper limits define the boundaries of the particular range. Ranges defined in this manner may or may not be inclusive and can be arbitrarily combined, i.e. any lower limit can be combined with any upper limit to form a range. For example, if ranges of 60-120 and 80-110 are listed for a particular parameter, it should understood that ranges of 60-110 and 80-120 are also contemplated. In addition, if the minimum range values listed are 1 and 2 and the maximum range values listed are 3, 4, and 5, the following ranges: 1-3, 1-4, 1-5, 2-3, 2-4 and 2-5 are all contemplated. In this application, unless otherwise indicated, the numerical range "a-b" denotes an abbreviated representation of any real number combination between a and b, where a and b are both real numbers. For example, a numerical range of "0-5" indicates that all real numbers between "0 and 5" have been fully set forth herein, and "0-5" is merely a shorthand representation of combinations of these numbers. In addition, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and alternative embodiments of the present disclosure may be combined with each other to form a new technical solution.

Unless otherwise specified, all the technical features and optional technical features of the present disclosure may be combined with each other to form a new technical solution.

Unless otherwise specified, all steps of the present disclosure may be performed sequentially or may be performed randomly, preferably sequentially. For example, the process includes steps (a) and (b), meaning that the process may include steps (a) and (b) performed sequentially, or may include steps (b) and (a) performed sequentially. For example, the referenced process may further include step (c), meaning that step (c) may be added to the process in any order. For example, the process may include steps (a), (b) and (c), may also include steps (a), (c) and (b), may also include steps (c), (a) and (b), etc.

Unless otherwise specified, reference to "including" and "comprising" in this application are intended to be open-ended as well as closed-ended. For example, reference to "including" and "comprising" may mean that other components not listed may also be included or included, or that only listed components may be included or included.

Unless otherwise specified, in this application, the term "or" is inclusive. For example, the phrase "A or B" means "A, B, or both A and B". More specifically, the condition "A or B" is satisfied by any one of the following conditions: A is true (or present) and B is false (or not present); A is false (or absent) and B is true (or present); or both A and B are true (or present).

[Secondary Battery]

A secondary battery, also referred to as a rechargeable battery or a storage battery, refers to a battery that can be continuously used by activating an active material by means of charging after the battery is discharged.

Generally, the secondary battery includes a positive pole plate, a negative pole plate, a separator, and an electrolyte. During charging and discharging of the battery, active ions (e.g., lithium ions) are intercalated and deintercalated between the positive pole plate and the negative pole plate. The separator is arranged between the positive pole plate and the negative pole plate, and mainly serves to prevent short circuit between the positive and negative poles, and at the same time, it can enable the active ions to pass through. The electrolyte between the positive pole plate and the negative pole plate mainly serves to conduct active ions. In the secondary battery of the present disclosure, a separator (also referred to as a diaphragm) is integrally arranged with a pole plate (a positive pole plate or a negative pole plate, preferably a negative pole plate) and then combined with another separately arranged pole plate to form an electric core.

[Polymer-Modified Porous Material]

An embodiment of the present disclosure provides a polymer-modified porous material, the polymer-modified porous material includes a porous material and a plurality of surface groups attached to the porous material; each of the surface groups includes a linking group and an adhesive group that are attached in sequence; the linking group has a structure represented by a structural unit I, Structural unit I where $\xi$ represents that O is linked to the porous material; the number of the structural units I in each of the surface groups is independent from each other; the total number n of moles of the structural units I in the polymer-modified porous material is 1,000-10,000;

a monomer forming the adhesive group is selected from any one or more of the group consisting of acrylic acid, ethylene, vinyl alcohol, ethylene imine, propylene, acrylonitrile, vinylidene fluoride, and tetrafluoroethylene; the number of the adhesive groups in each of the surface groups is independent from each other; and the total number m of moles of the adhesive groups in the polymer-modified porous material is 10-1,000, and n/m=10-1,000.

In the polymer-modified porous material of the present disclosure, the surface group and the porous material form a separator in an integral form. Therefore, the porous material may spread well in the coating to form a tightly interlaced organic polymer network, which may improve the insulation of the separator and prevent the occurrence of self-discharge, thereby ensuring the cyclability and long-term safety and reliability of the battery. Furthermore, since a large number of organic groups are grafted on the surface of the porous material, the contact effect of the separator formed of the polymer-modified porous material with the electrolyte is increased, facilitating the infiltration of the electrolyte, and improving the electrochemical performance of the cell. At the same time, by controlling the ratio of the adhesive group and the linking group, not only the barrier effect of the porous material on the electron conduction, but also the sufficient adhesion between the separator formed by the polymer-modified porous material and the pole plate can be ensured, thereby ensuring the long-term cycle stability of the battery.

The above values of m and n may be measured using a nuclear magnetic resonance apparatus, for example, the values of m and n can be measured by a nuclear magnetic resonance hydrogen spectrum.

The above-mentioned linking group serves to link the porous material and the adhesive group. The adhesive group is mainly used to form a separator and provide adhesion to a substrate (such as an active material layer of a pole plate). In some embodiments, m=50-500; optionally n=5,000-1, 0000; optionally, n/m=50-500 to provide an insulating barrier with sufficient porous materials and to have sufficient surface groups to optimize the spreading effect of the porous material upon separator formation, so as to further optimize the electron conduction barrier effect of the separator formed by the polymer-modified porous material and the bonding effect with the pole plate.

The porous material used in the present disclosure may be selected from materials conventionally used for membrane electrodes. In order to improve the modification effect of surface groups on the porous material, in some embodiments, the porous material includes at least one of an inorganic material and an organic-inorganic hybrid material. Optionally, the porous material is selected from any one or more of the group consisting of diatomite, zeolite, montmorillonite, kaolin, and a metal-organic framework material. The porous materials described above all have good electron barrier properties. Further, each of the above inorganic porous materials has a surface hydroxyl group on the surface thereof, thereby providing a convenient condition for grafting of a linking group, making the surface modification effect more stable.

In some embodiments, the polymer-modified porous material has a $D_{v50}$ of 2 μm-15 μm; optionally, the polymer-modified porous material has a BET specific surface area of 10 to 80 g/m². By using the polymer-modified porous material with the above particle size and specific surface area, there are as many surface groups as possible, and there is a good insulating effect in the polymer-modified porous material.

The specific surface area of BET described above may be can be carried out using the following method.

Reference Standards: GB/T 19587-2017 Gas adsorption-BET method for determination of specific surface area of solid materials; Test equipment: specific surface and porosity analyzer; Instrument model: US Mac Tri Star 3020; Test Method: refer to WI-PCA-016 "Work Instruction for Specific Surface Area Analysis by Gas Adsorption Method", the key parameters are as follows: degassing time/temperature: 2 hrs/200° C.

The median particle diameter ($D_{v50}$) of the above particles may be determined by the following method.

The granularity of the material was measured by the reference standard GB/T 19077-2016/IS013320:2009, the $D_{v50}$ in the result was taken as the median particle size. Test equipment: Malvern Laser Particle Size Analyzer, Instrument Model: Master Size 2000; Test Method: refer to WI-PCA-027 "Work Instruction for Laser Particle Size Analysis"; the key parameters are as follows: dispersants: 2 drops of 1% CPF special dispersant; solvent: 20 ml DI water; obscuration: 8-12%; sample injection method: full sample injection.

The present disclosure also provides a method for preparing the above-mentioned polymer-modified porous material. The following preparation method is merely an example for the preparation method of the polymer-modified porous material, and does not constitute a definition for the polymer-modified porous material.

Acryloyl chloride and an inorganic porous material (such as diatomite, calculated as silica) were added under the catalysis of a catalyst (such as triethylamine) in a tetrahydrofuran solution at 0° C.-10° C. for a reaction time to obtain a process product A, so that the acryloyl chloride was reacted with the surface hydroxyl groups of the inorganic porous material to graft onto the surface of the inorganic porous material.

2) A certain amount of product A and a certain amount of a binding monomer (such as acrylic acid, ethylene, vinyl alcohol, ethylene imine, propylene, acrylonitrile, vinylidene fluoride or tetrafluoroethylene) were weighed and dissolved in tetrahydrofuran and vacuumized (to avoid oxidation of free radicals). A three-neck flask was continuously introduced with $N_2$, added with an initiator, heated to 50° C.-100° C., and stirred for a period of reaction time. The resulting crude product was poured into 0° C. glacial ethyl ether for precipitation to obtain a polymer-modified porous material.

The above-mentioned initiator may be adjusted according to the binding monomer used. For example, the binding monomer is acrylic acid, and azo-bis-isobutyronitrile is used as an initiator.

In addition, the ratio of the inorganic porous material and the surface group in the polymer-modified porous material, and the ratio of the linking group and the adhesive group in the surface group may be adjusted by adjusting the amounts of acryloyl chloride, the inorganic porous material, the product A, and the binding monomer. A person skilled in the art would have been able to determine the amount of raw materials and the above-mentioned ratio of the final product on the basis of routine tests, and this application does not make a one-by-one description.

Another embodiment of the present disclosure provides a membrane electrode including a pole plate and a separator. The pole plate includes a current collector and an active material layer disposed on at least one surface of the current collector. The separator being disposed on a surface of the active material layer away from the current collector. The separator includes any one of the polymer-modified porous material described above.

In the polymer-modified porous material of the present disclosure, the surface group and the porous material form a separator in an integral form. Therefore, the porous material may spread well in the coating to form a tightly interlaced organic polymer network, which may improve the insulation of the separator and prevent the occurrence of self-discharge, thereby ensuring the cyclability and long-term safety and reliability of the battery. Furthermore, since a large number of organic groups are grafted on the surface of the porous material, the contact effect of the separator formed of the polymer-modified porous material with the electrolyte is increased, facilitating the infiltration of the electrolyte, and improving the electrochemical performance of the cell. At the same time, by controlling the ratio of the adhesive group and the linking group, not only the barrier effect of the porous material on the electron conduction, but also the sufficient adhesion between the separator formed by the polymer-modified porous material and the pole plate can be ensured, thereby ensure the long-term cycle stability of the battery.

In the present disclosure, a separator and a pole plate are integrally arranged in the membrane electrode. The function of the separator therein is the same as that of a separator provided independently, both of which insulate the positive and negative pole plates and ensure the penetration of active ions. In some embodiments, the separator has a thickness of 2-80 m, optionally the separator has a thickness of 5-50 km. It avoids the decrease of the insulation effect due to too small thickness of the separator, and at the same time, it avoids the long penetration path of active ions due to too large thickness of the separator, affecting the electrical performance and cycling performance.

In the membrane electrode of the present disclosure, the pole plate may be either a negative pole plate or a positive pole plate. Based on the current conventional cell assembly, in order to achieve sufficient insulation and use of the active material, the active layer area of the negative pole plate is greater than the active layer area of the positive pole plate, and thus it is preferred that the above-mentioned pole plate is a negative pole plate, so as to provide more separator area, and to leave sufficient space for the negative pole to reserve a safe size.

Since the adhesive group equivalent to the adhesive and the insulating material in the separator of the present disclosure are integrally arranged, the adhesive property between the separator and the active material layer is optimized. In some embodiments, after measurement, the peel strength between the separator to the active material layer is 5.5 N/m-15 N/m; optionally, the peel strength between the separator and the active material layer is 6 N/m-14 N/m.

Taking the case when the membrane electrode is the negative membrane electrode as an example, during assembly of the cell of the secondary battery, it is stacked in a manner of a negative membrane electrode, a double-sided positive pole, a negative separator pole, and a double-sided positive pole, etc. The positive pole plate and the negative pole plate are exemplified below.

[Positive Pole Plate]

The positive pole plate typically includes a positive pole current collector and a positive pole separator layer disposed on at least one surface of the positive pole current collector, the positive pole separator layer including a positive pole active material.

As an example, the positive pole current collector has two surfaces opposed in its own thickness direction. The positive pole separator layer is arranged on either or both of the two surfaces opposed to the positive pole current collector.

In some embodiments, the positive current collector may be a metal foil or a composite current collector. For example, an aluminum foil may be used as the metal foil. The composite current collector may include a polymer material base layer and a metal layer formed on at least one surface of the polymer material base layer. The composite current collector may be formed by forming a metallic material (aluminum, aluminum alloy, nickel, nickel alloy, titanium, titanium alloy, silver, silver alloy, etc.) on a substrate of a material (such as a substrate of polypropylene (PP), polyethylene terephthalate (PET), polybutylene terephthalate (PBT), polystyrene (PS), polyethylene (PE), etc.).

In some embodiments, the positive pole active material may employ a positive pole active material for a battery known in the art. As an example, the positive pole active material may include at least one of the following materials: lithium-containing phosphates of the olivine structure, lithium transition metal oxides and their respective modified compounds. However, the present disclosure is not limited to these materials, and other conventional materials that can be used as a positive pole active material for a battery can also be used. These positive pole active materials may be used alone or in combination of two or more. Examples of the lithium transition metal oxide may include, but are not limited to, at least one of lithium cobalt oxide (such as $LiCoO_2$), lithium nickel oxide (such as $LiNiO_2$), lithium manganese oxide (such as $LiMnO_2$, $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (also referred to NCM$_{333}$ for short), $LiNi_{0.5}Co_{0.2}Mn_{0.3}O_2$ (also referred to NCM$_{523}$ for short), $LiNi_{0.5}Co_{0.25}Mn_{0.25}O_2$ (also referred to as NCM$_{211}$ for short), $LiNi_{0.6}Co_{0.2}Mn_{0.2}O_2$ (also referred to as NCM$_{622}$ for short), $LiNi_{0.5}Co_{0.1}Mn_{0.1}O_2$ (also referred to NCM$_{811}$ for short), lithium nickel cobalt aluminum oxide (such as $LiNi_{0.85}Co_{0.15}Al_{0.05}O_2$) and the modified compounds thereof, etc. Examples of the lithium-containing phosphate of the olivine structure may include, but are not limited to, at least one of lithium iron phosphate (such as $LiFePO_4$ (also referred to LFP for short)), a composite of lithium iron phosphate and carbon, lithium manganese phosphate (such as $LiMnPO_4$), a composite of lithium manganese phosphate and carbon, lithium iron manganese phosphate, a composite of lithium iron manganese phosphate and carbon.

In some embodiments, the positive pole separator layer also optionally includes a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorine-containing acrylate resin.

In some embodiments, the positive pole separator layer also optionally includes a conductive agent. As an example, the conductive agent may include at least one of superconducting carbon, acetylene black, carbon black, ketjen black, carbon dots, carbon nanotubes, graphene, and carbon nanofibers.

In some embodiments, the positive pole plate may be prepared by dispersing the above-mentioned components for preparing a positive pole plate, such as a positive pole active material, a conductive agent, a binder and any other components, in a solvent (such as N-methyl pyrrolidone) to form a cathode slurry; coating the cathode slurry on the positive pole current collector; and obtaining the positive pole plate after drying, cold pressing and other processes.

[Negative Pole Plate]

The negative pole plate includes a negative pole current collector and a negative pole separator layer disposed on at least one surface of the negative pole current collector, the negative pole separator layer includes a negative pole active material.

As an example, the negative pole current collector has two surfaces opposed in its own thickness direction. The negative pole separator layer is arranged on either or both of the two surfaces opposed to the negative pole current collector. The present disclosure further arranges a separator on the negative pole plate to form an integrated membrane electrode.

In some embodiments, the negative current collector may be a metal foil or a composite current collector. For example, a copper foil may be used as the metal foil. The composite current collector may include a polymer material base layer and a metal layer formed on at least one surface of the polymer material substrate. The composite current collector may be formed by forming a metallic material (copper, copper alloy, nickel, nickel alloy, titanium, titanium alloy, silver, silver alloy, etc.) on a substrate of a polymer material (such as a substrate of polypropylene (PP), polyethylene terephthalate (PET), polybutylene terephthalate (PBT), polystyrene (PS), polyethylene (PE), etc.).

In some embodiments, the negative pole active material may employ a negative pole active material known in the art for batteries. As an example, the negative pole active material may include at least one of the following materials: artificial graphite, natural graphite, soft carbon, hard carbon, silicon-based materials, tin-based materials and lithium titanate, etc. The silicon-based materials may be selected from at least one of elemental silicon, silicon-oxygen compounds, silicon-carbon complexes, silicon-nitrogen complexes, and silicon alloys. The tin-based material may be selected from at least one of elemental tin, tin-oxygen compounds, and tin alloys. However, the present disclosure is not limited to these materials, and other conventional materials that can be used as a negative pole active material for a battery can also be used. These negative pole active materials may be used alone or in combination of two or more.

In some embodiments, the negative pole separator layer also optionally includes a binder. By way of example, the binder may be selected from at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative pole separator layer also optionally includes a conductive agent. As an example, the conductive agent may be selected from at least one of superconducting carbon, acetylene black, carbon black, ketjen black, carbon dots, carbon nanotubes, graphene, and carbon nanofibers.

In some embodiments, the negative pole separator layer may also optionally include other adjuvants, such as thickeners (e.g., sodium carboxymethylcellulose (CMC-Na)), etc.

In some embodiments, the negative pole plate may be prepared by dispersing the above-mentioned components for preparing a negative pole plate, such as a negative pole active material, a conductive agent, a binder, and any other components, in a solvent (such as deionized water) to form an anode slurry; coating the anode slurry on the negative pole current collector; and obtaining the negative pole plate after drying, cold pressing and other processes.

[Electrolyte]

The electrolyte serves to conduct ions between the positive pole plate and the negative pole plate. The type of electrolyte is not specifically limited in the present disclosure, and can be selected according to requirements. For example, the electrolyte may be liquid, gel, or all-solid.

In some embodiments, the electrolyte is liquid and includes an electrolyte salt and a solvent.

In some embodiments, the electrolyte salt can be selected from at least one of lithium hexafluorophosphate, lithium tetrafluoroborate, lithium perchlorate, lithium hexafluoroarsenate, lithium bisfluorosulfonimide, lithium bis-trifluoromethane sulfonimide, lithium triflate, lithium difluorophosphate, lithium difluorooxalato borate, lithium dioxalato borate, lithium difluorobisoxalato phosphate, and lithium tetrafluorooxalato phosphate.

In some embodiments, the solvent can be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, ethylene fluorocarbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte further optionally includes an additive. As an example, the additive may include a negative pole separator-forming additive, a positive pole separator-forming additive, and may further include an additive capable of improving certain properties of the battery, for example, an additive for improving overcharge properties of the battery, an additive for improving high-temperature or low-temperature properties of the battery, etc.

In some embodiments, the electrode assembly may be made by a winding process or a lamination process.

In some embodiments, the secondary battery may include an outer package. The outer package may be used to encapsulate the electrode assembly and the electrolyte.

In some embodiments, the outer package of the secondary battery may be a hard case such as a hard plastic case, an aluminum case, a steel case, and the like. The outer package of the secondary battery may also be a soft package, such as a pouch-type package. The material of the soft package may be plastic, as plastic, polypropylene, polybutylene terephthalate, polybutylene succinate, etc may be listed.

Figure 2:
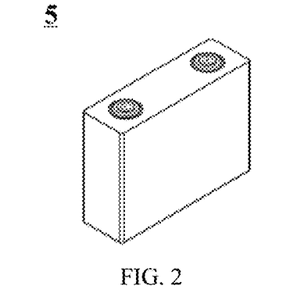
FIG. 2 is a schematic view of a secondary battery according to an embodiment of the present disclosure.

The shape of the secondary battery is not particularly limited in the present disclosure, and may be cylindrical, square or any other shape. For example, FIG. 2 is a secondary battery 5 having a square structure as one example.

Figure 3:
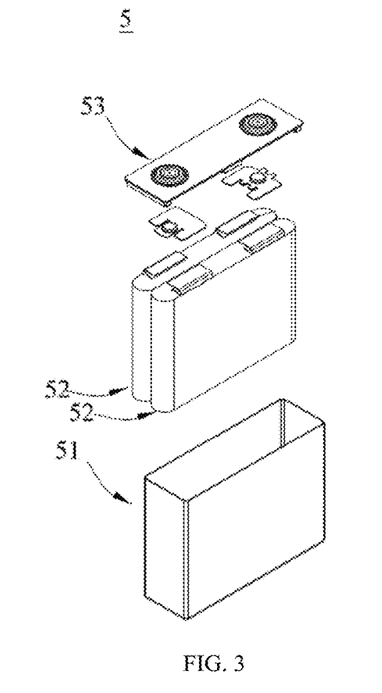
FIG. 3 is an exploded view of the secondary battery of an embodiment of the present disclosure shown in FIG. 2.

In some embodiments, referring to FIG. 3, the outer package may include a housing 51 and a cover plate 53. The housing 51 may include a bottom plate and a side plate connected to the bottom plate, the bottom plate and the side plate are enclosed to form an accommodating cavity. The housing 51 has an opening communicating with the accommodating cavity. The cover plate 53 may be covered on the opening to enclose the accommodating cavity. The positive pole plate, the negative pole plate, and the separator may form the electrode assembly 52 by a winding process or a lamination process. An electrode assembly 52 is encapsulated within the accommodating cavity. The electrolyte is infiltrated into the electrode assembly 52. The number of the electrode assemblies 52 contained in the secondary battery 5 may be one or more. A person skilled in the art would have been able to make a selection according to specific actual requirements.

In some embodiments, the secondary batteries may be assembled into a battery module. The number of secondary batteries contained in the battery module may be one or more. The specific number may be selected by a person skilled in the art according to the application and capacity of the battery module.

Figure 4:
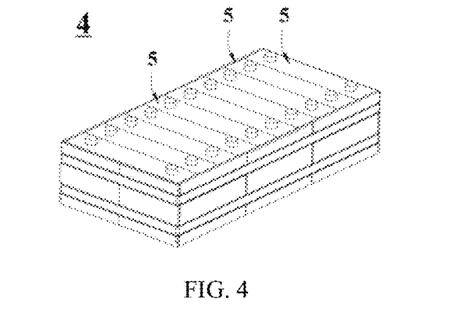
FIG. 4 is a schematic view of a battery module according to an embodiment of the present disclosure.

FIG. 4 shows a battery module 4 as one example. Referring to FIG. 4, in the battery module 4, a plurality of secondary batteries 5 may be sequentially arranged along the length direction of the battery module 4. Of course, it may be arranged in any other manner. The plurality of secondary batteries 5 may further be fixed by fasteners.

Optionally, the battery module 4 may further include a housing having an accommodating space in which the plurality of secondary batteries 5 are accommodated.

In some embodiments, the above-mentioned battery modules may also be assembled into a battery pack. The number of battery modules contained in the battery pack may be one or more. The specific number may be selected by a person skilled in the art according to the application and capacity of the battery pack.

Figure 5:
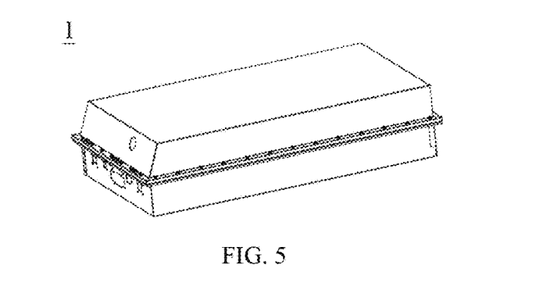
FIG. 5 is a schematic diagram of a battery pack according to an embodiment of the present disclosure.
Figure 6:
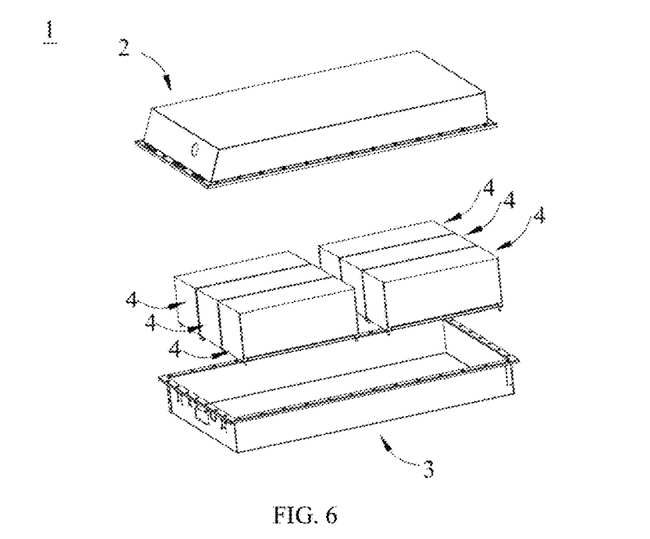
FIG. 6 is an exploded view of a battery pack of an embodiment of the present disclosure shown in FIG. 5.

FIGS. 5 and 6 shows a battery pack 1 as one example. Referring to FIGS. 5 and 6, a battery box and a plurality of battery modules 4 arranged in the battery box may be included in the battery pack 1. The battery box includes an upper box body 2 and a lower box body 3. The upper box body 2 can cover the lower box body 3 and forms an enclosed space for accommodating the battery module 4. The plurality of battery modules 4 may be arranged in the battery box in an arbitrary manner.

In addition, the present disclosure also provides an electric device including at least one of the secondary battery, the battery module, or the battery packs provided herein. The secondary battery, the battery module, or the battery pack may be used as a power source for the electric device as well as an energy storage unit for the electric device. The electric device may include, but is not limited to, mobile equipment (e.g. cell phones, notebook computers, etc.), electric vehicles (e.g. pure electric vehicles, hybrid electric vehicles, plug-in hybrid electric vehicles, electric bicycles, electric scooters, electric golf carts, electric trucks, etc.), electric trains, ships and satellites, and energy storage systems, etc.

For the electric device, a secondary battery, a battery module, or a battery pack may be selected according to its usage requirements.

Figure 7:
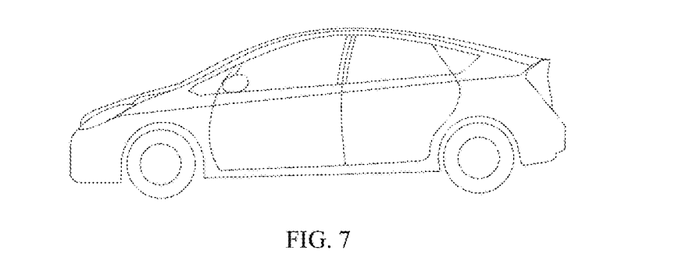
FIG. 7 is a schematic view of an electric device using a secondary battery as a power source according to an embodiment of the present disclosure.

FIG. 7 is an electric device as an example. The electric device is a pure electric vehicle, a hybrid electric vehicle, or a plug-in hybrid electric vehicle. To meet the high power and high energy density requirements of the secondary battery for the electric device, a battery pack or battery module may be employed.

EXAMPLES

Hereinafter, examples of the present disclosure will be described. The examples described below are exemplary, and they are intended to be illustrative of the present disclosure and are not to be construed as limiting the present disclosure. Where specific techniques or conditions are not described in the examples, they are performed according to techniques or conditions described in the literature in the art or according to the product description. The reagents or instruments used without specifying manufacturers are all conventional products which are commercially available.

| Substances | Manufacturers |
|---|---|
| Diatomite | Yixing Junlian Diatomite Co. Ltd. |
| Zeolite powder | Chaoyang Xinhe Zeolite Technology Co. Ltd. |
| Kaolin | Shanghai Kaiyin Chemical Co. Ltd. |
| MOF-74 | Jiangsu Xianfeng Nano Material Technology Co. Ltd. |
| Graphite | Beiterui New Material Group Co. Ltd. |

Example 1

Figure 1:
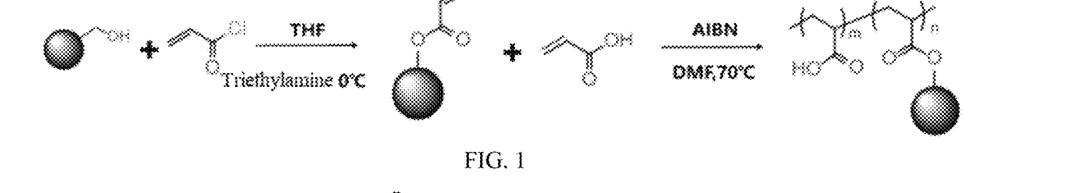
FIG. 1 is a chemical reaction scheme showing a polymer-modified porous material of Example 1.

Preparation of Polymer-Modified Insulating Porous Materials
1) 1.1 mol acryloyl chloride and 1 mol diatomite (in terms of $SiO_2$) were added to a tetrahydrofuran solution under the catalysis of 1 mL triethylamine at 0° C. for 4 h to obtain a process product A.
2) 0.02 mol of product A and 1 mol of acrylic acid (viscous monomer) were weighed and dissolved in 200 mL of tetrahydrofuran, and vacuumized (to avoid oxidation of free radicals). A three-neck flask was continuously introduced with $N_2$, added with 0.05 g of azo-bis-isobutyronitrile as an initiator, heated to 70° C., and stirred for reacting for 12 h. The resulting crude product was poured into 0° C. glacial diethyl ether for precipitation to obtain a polymer-modified diatomite. The chemical reaction in the above process may refer to the reaction process shown in FIG. 1.

Preparation of Separator Layer Coating Slurry
The resulting polymer-modified diatomite was dispersed in deionized water in a volume ratio of powder and water of 8:2. The mixture was quickly stirred at a rotation speed of 800 r/min for 1 h and uniformly mixed to obtain a separator coating slurry, and then slowly stirred at a rotation speed of 100 r/min for use.

Manufacture of Lithium Ion Battery
Preparation of positive pole plate: a nickel-cobalt-manganese ternary cathode material $LiNi_{0.5}Co_{0.2}Mn_{0.3}O_2$, SP and PVDF were added in a ratio of 96:2.5:1.5 and mixed uniformly. The mixture was added with a solvent NMP to adjust the solid content to 75%, and stirred uniformly to obtain a cathode slurry, which was then coated, dried, cold pressed and slit to prepare a positive pole plate.

Preparation of negative pole plate: after dry mixing the graphite and SP at a ratio of 97:3, the mixture was added deionized water to adjust the solid content to 50%, and stirred uniformly to obtain an anode slurry, which was coated, dried and cold pressed to obtain a negative pole plate. Then the separator coating slurry was coated on the negative pole plate, the coating layer having a thickness of 30 m, dried again and slit to prepare a membrane electrode of a negative pole+a separator layer.

Preparation of Electrolyte: ethylene carbonate (EC), ethyl methyl carbonate (EMC) and diethyl carbonate (DEC) were mixed in a volume ratio of 1:1:1, and then LiPF6 was uniformly dissolved in the above solution to obtain an electrolyte. The concentration of LiPF6 in the electrolyte was 1 mol/L.

A lithium ion battery is prepared by winding the pole plate prepared in the previous two steps into a core, encapsulating the core into a dry core using an aluminium-plastic separator, and performing processes such as injection liquefaction and aging.

Examples 2-3

The difference from Example 1 is that the viscous monomer in the preparation of the polymer modified diatomite was replaced with the corresponding monomer in the table below.

| Examples | Viscous monomer |
|---|---|
| Example 2 | Vinylidene fluoride |
| Example 3 | Tetrafluoroethylene |
| Example 4 | Ethylene |
| Example 5 | Vinyl alcohol |
| Example 6 | Ethylenimine |
| Example 7 | Acrylonitrile |

Examples 8-14, Comparative Examples 2-4

The difference from Example 1 was that the amounts of acrylic acid and Intermediate product A added were adjusted according to the following table.

| Examples | Intermediate product A (mol) | Acrylic acid (mol) |
|---|---|---|
| Example 8 | 0.01 | 2 |
| Example 9 | 0.1 | 1 |
| Example 10 | 0.002 | 2 |
| Example 11 | 0.002 | 0.2 |
| Example 12 | 0.2 | 2 |
| Example 13 | 0.004 | 2 |
| Example 14 | 0.04 | 1.2 |
| Comparative Example 2 | 0.2 | 1 |
| Comparative Example 3 | 0.001 | 1 |
| Comparative Example 4 | 0.01 | 0.16 |

Examples 15-17

The difference from Example 1 was that the porous materials in the following table were used instead of diatomite.

| Examples | Porous materials |
| --- | --- |
| Example 15 | Zeolite powder |
| Example 16 | Kaolin |
| Example 17 | MOF-74 |

Examples 18-22

The difference from Example 1 was that the coating thickness of the separator layer was adjusted according to the following table.

| Examples | Separator layer thickness (μm) |
| --- | --- |
| Example 18 | 2 |
| Example 19 | 5 |
| Example 20 | 50 |
| Example 21 | 80 |
| Example 22 | 90 |

Comparative Example 1

The difference from Example 1 was that the separator layer slurry was prepared by adding polyacrylate and diatomite (the same raw material as diatomite) into deionized water in a mass ratio of 10:90, quickly stirred at a rotation speed of 800 r/min for 1 h, and then slowly stirred at a rotation speed of 100 r/min for use.

[Detection of polymer-modified porous materials] The values of m and n may be characterized and calculated by using the nuclear magnetic resonance hydrogen spectroscopy. Specific characterization related information was as follows.

The molecular structure of the product was determined on a Bruker AVANCE III 400 NMR spectrometer with a test temperature of 25° C., using tetramethylsilane (TMS) as the internal standard and deuterated chloroform ($CDCl_3$) as the solvent.

Test procedure: 5 mg of sample was dissolved in the above-mentioned solvent. The mixture was transferred into a NMR tube, and injected 1 mL for testing.

The values of m and n can be determined by the peak areas of the characteristic hydrogens in the corresponding polymerization units in the additive molecule.

[Pole Plate Test]
1. Pole Plate Adhesion Test

A negative pole+separator layer composite pole plate of each example and comparative example was taken and cut to obtain a test sample having a length of 100 mm and a width of 10 mm. A stainless steel plate with a width of 25 mm was applied with a double-sided tape (with a width of 11 mm). One side of the negative pole material layer on the test sample was adhered to the double-sided tape on the stainless steel plate, and roll back and forth on its surface with a 2000 g pressure roller at a speed of 300 mm/min for three times. Then, one end of the test sample was bent at 180 degrees. The negative pole material layer of the test sample and the current collector were manually peeled apart by 25 mm along the length direction. The test sample was fixed on a testing machine (Model: INSTRON 336), so that the peeling surface was consistent with the force line of the testing machine (namely, parallel to the movement direction of the testing machine when peeling). Perform continuous peeling at a speed of 30 mm/min by using the testing machine, to obtain a peeling force curve. The average of the stable segment (i.e., the segment on the peel force curve that no longer monotonically increased) was taken as the peel force F0. The adhesion F between the separator layer and the negative pole plate=F0/width of the test sample (a measure unit of F is N/m).

2. Separator Layer Thickness Test

The thickness of the separator layer may be calculated by measuring the difference between the thickness of the pole plate before and after coating with a spiral micrometer.

[Battery Performance Test]
(1) Test on Cycle Performance of Battery

The battery was charged at a constant current of ⅓ C to a voltage of 4.3V and then charged at a constant voltage of 4.3V to a current of 0.05 C at 25° C., stand for 5 minutes and then discharged at ⅓ C to a voltage of 2.8V. The obtained capacity was recorded as an initial capacity $C0$. For the same battery above, the above steps were repeated, and the discharge capacity $Cn$ of the battery after the $n^{th}$ cycle was recorded at the same time. The capacity retention rate of the battery after each cycle was $Pn=Cn/C0\times100\%$. The discharge capacity retention rates after the $1000^{th}$ cycle of the examples and comparative examples were respectively measured.

2. Battery Self-Discharge Test

At 25° C., the battery was charged to a voltage of 4.3V at a constant current of ⅓ C, and then charged to a current of 0.05 C at a constant voltage of 4.3V, and set aside for 30 days. After 30 days, the voltage $V_1$ of the battery was measured again. The self-discharge rate was calculated by $S=(4.3-V_1)/4.3\times100\%$.

The results of the tests above were reported in Table 1.

TABLE 1

| Serial Number | n | m | n/m | $D_{v50}$ of modified material (μm) | BET specific surface area of the modified material (g/m²) | Separator coating thickness (μm) | Separator coating adhesion (N/m) | Self-discharge rate (%) | Cycle volume retention rate (%) |
| --- | --- | --- | --- | --- | --- | --- | --- | --- | --- |
| Comparative Example 1 | / | / | / | 5.2 | 56.0 | 30 | 5.4 | 3.54 | 86.0 |
| Example 1 | 5005 | 98 | 51 | 6.3 | 49.3 | 30 | 8.9 | 1.58 | 91.0 |
| Example 2 | 5023 | 105 | 48 | 6.7 | 45.3 | 30 | 13.5 | 1.48 | 89.2 |
| Example 3 | 5018 | 102 | 49 | 6.6 | 45.8 | 30 | 12.3 | 1.52 | 89.7 |

TABLE 1-continued

| Serial Number | n | m | n/m | $D_{V50}$ of modified material (μm) | BET specific surface area of the modified material (g/m²) | Separator coating thickness (μm) | Separator coating adhesion (N/m) | Self-discharge rate (%) | Cycle volume retention rate (%) |
|---|---|---|---|---|---|---|---|---|---|
| Example 4 | 5010 | 99 | 51 | 5.4 | 54.3 | 30 | 8.4 | 1.67 | 88.3 |
| Example 5 | 5001 | 98 | 51 | 5.5 | 54.6 | 30 | 8.2 | 1.87 | 88.0 |
| Example 6 | 4988 | 99 | 50 | 5.7 | 54.2 | 30 | 7.9 | 1.76 | 87.4 |
| Example 7 | 4998 | 103 | 49 | 6.4 | 48.8 | 30 | 7.8 | 1.83 | 87.3 |
| Example 8 | 9879 | 51 | 194 | 6.7 | 47.0 | 30 | 10.8 | 1.75 | 90.5 |
| Example 9 | 5012 | 504 | 10 | 6.1 | 50.4 | 30 | 7.9 | 1.46 | 89.2 |
| Example 10 | 9976 | 10 | 998 | 7.2 | 53.2 | 30 | 13.4 | 2.33 | 87.9 |
| Example 11 | 1002 | 10 | 100 | 6.4 | 50.5 | 30 | 7.5 | 1.76 | 87.2 |
| Example 12 | 9997 | 1000 | 10 | 6.1 | 50.6 | 30 | 8.2 | 1.45 | 88.6 |
| Example 13 | 10007 | 22 | 500 | 6.8 | 44.3 | 30 | 13.1 | 2.15 | 89.7 |
| Example 14 | 6011 | 200 | 30 | 6.3 | 49.5 | 30 | 7.5 | 1.76 | 89.5 |
| Example 15 | 5011 | 99 | 51 | 4.5 | 68.3 | 30 | 9.3 | 1.74 | 90.1 |
| Example 16 | 5002 | 99 | 51 | 4.1 | 71.2 | 30 | 10.2 | 2.05 | 88.2 |
| Example 17 | 5004 | 98 | 51 | 2.1 | 78.0 | 30 | 8.3 | 2.13 | 86.3 |
| Example 18 | 5005 | 98 | 51 | 6.3 | 49.3 | 3 | 5.6 | 3.49 | 86.2 |
| Example 19 | 5005 | 98 | 51 | 6.3 | 49.3 | 5 | 6.2 | 2.78 | 86.5 |
| Example 20 | 5005 | 98 | 51 | 6.3 | 49.3 | 50 | 9.2 | 0.92 | 88.5 |
| Example 21 | 5005 | 98 | 51 | 6.3 | 49.3 | 80 | 8.7 | 0.76 | 87.1 |
| Example 22 | 5005 | 98 | 51 | 6.3 | 49.3 | 90 | 7.6 | 0.58 | 86.4 |
| Comparative Example 2 | 5007 | 1004 | 5 | 5.3 | 55.6 | 30 | 5.5 | 2.05 | 86.2 |
| Comparative Example 3 | 5001 | 5 | 1000 | 7.5 | 42.3 | 30 | 13.9 | 2.50 | 86.3 |
| Comparative Example 4 | 804 | 52 | 15 | 6.2 | 50.2 | 30 | 6.4 | 1.90 | 86.3 |

It can be seen by comparing Example 1 with the comparative example that after linking the diatomite with the adhesive monomer by using the solution of the present invention, the spreading property of the polymer modified material is better. Thus, the coated separator layer has a stronger adhesion and thus has a better long-term reliability. At the same time, the self-discharge is significantly improved, and the long-term cycle performance is also improved accordingly.

Examples 1-7 illustrate that the solution of the present invention is not limited to a single binder system, but extends to binders commonly used in lithium ion batteries.

Comparison of Examples 8-14 with Example 1 shows that the polymerization monomer of the diatomite and the binder molecule needs to be controlled within a certain ratio range. When the number of polymerization units of the binder molecule monomer is relatively high (Example 8/10), the adhesion of the separator coating is high. However, since the number of diatomite molecule units is less, the effect of isolating electron conduction between the positive and negative poles is weakened, and the effect of improving the self discharge of the battery is insufficient. There are more side reactions between the positive and negative poles, thus affecting the performance of the battery. However, when the number of diatomite molecular units is too larger and the number of binder molecules is smaller (Example 9), the adhesion of the separator coating is decreased, which is unfavorable for optimizing the long-term performance of the battery.

In addition, it can be shown by comparing Examples 18-22 with Example 1 that when the thickness of the coating layer of the separator is too thin, the improvement of isolation effect for the separator is insufficient and the self-discharge control is insufficient. However, when the separator layer is too thick, although the electron path between the positive and negative poles is well isolated and the self-discharge is small, the resistance of the battery is increased and the polarization is increased, which resulting in the increase of battery capacity attenuation.

While the present disclosure has been described with reference to preferred embodiments, various modifications may be made and equivalents may be substituted for components thereof without departing from the scope of the present disclosure. In particular, the technical features mentioned in the various embodiments may be combined in any manner as long as there is no structural conflicts. The present disclosure is not limited to the particular embodiments disclosed herein, but includes all technical solutions falling within the scope of the claims.

What is claimed is:

1. A polymer-modified porous material, wherein the polymer-modified porous material comprises a porous material and a plurality of surface groups attached to the porous material, each of the plurality of surface groups comprising a linking group and an adhesive group that are attached in sequence, the linking group having a structure represented by a structural unit I, Structural unit I wherein $\xi$ represents that O is linked to the porous material; the number of the structural units I in each of the plurality of surface groups is independent from each other; and the total number n of moles of the structural units I in the polymer-modified porous material ranges from 1,000 to 10,000;

a monomer forming the adhesive group is selected from any one or more of the group consisting of acrylic acid, ethylene, vinyl alcohol, ethylene imine, propylene, acrylonitrile, vinylidene fluoride, and tetrafluoroethylene; the number of the adhesive groups in each of the plurality of surface groups is independent from each other; the total number m of moles of the adhesive groups in the polymer-modified porous material ranges from 10 to 1,000, and n/m=10-1,000.

2. The polymer-modified porous material according to claim 1, wherein m=50-500.

3. The polymer-modified porous material according to claim 1, wherein the porous material is selected from any one or more of the group consisting of diatomite, zeolite, montmorillonite, kaolin, and a metal-organic framework material.

4. The polymer-modified porous material according to claim 1, wherein the polymer-modified porous material has a $D_{V50}$ of 2 µm-15 µm.

5. A membrane electrode, comprising a pole plate and a separator, the pole plate comprising a current collector and an active material layer disposed on at least one surface of the current collector, the separator being disposed on a surface of the active material layer facing away from the current collector, wherein the separator comprises the polymer-modified porous material according to claim 1.

6. The membrane electrode according to claim 5, wherein the separator has a thickness ranging from 2 µm to 80 µm.

7. The membrane electrode according to claim 5, wherein the pole plate is a negative pole plate.

8. The membrane electrode according to claim 5, wherein a peel strength between the separator and the active material layer ranges from 5.5 N/m to 15 N/m.

9. A secondary battery, comprising a membrane electrode, wherein the membrane electrode is the membrane electrode according to claim 5.

10. An electrical device, comprising a secondary battery or a battery module or a battery pack comprising the secondary battery, wherein the secondary battery is the secondary battery according to claim 9.

11. The polymer-modified porous material according to claim 1, wherein n=5,000-10,000.

12. The polymer-modified porous material according to claim 1, wherein n/m=50-500.

13. The polymer-modified porous material according to claim 1, wherein m=50-500, n=5,000-10,000 and n/m=10-1,000.

14. The polymer-modified porous material according to claim 1 wherein n=1,000-10,000, m=10-1,000 and n/m=50-500.

15. The polymer-modified porous material according to claim 1, wherein the polymer-modified porous material has a BET specific surface area of 10 $g/m^2$ to 80 $g/m^2$.

16. The membrane electrode according to claim 5, wherein the separator has a thickness ranging from 5 µm to 50 µm.

17. The membrane electrode according to claim 5, wherein a peel strength between the separator and the active material layer ranges from 6 N/m to 14 N/m.

* * * * *